United States Patent [19]
Thieme et al.

[11] 3,874,791
[45] Apr. 1, 1975

[54] PHOTOGRAPHIC PRINTER WITH AUTOMATIC POSITIONING CONTROL

[75] Inventors: Hans Thieme, Unterhaching; Friedrich Hujer, Grunwald; Harald Fengler, Taufkirchen near Munich, all of Germany

[73] Assignee: Agfa-Gevaert Aktiengesellschaft, Leverkusen, Germany

[22] Filed: Sept. 19, 1973

[21] Appl. No.: 398,771

[30] Foreign Application Priority Data
Sept. 20, 1972 Germany............................ 2246066

[52] U.S. Cl.................... 355/41, 226/29, 250/227, 353/26, 355/50
[51] Int. Cl.......................................... G03b 27/46
[58] Field of Search........... 355/50, 41, 38, 29; 353/26; 226/29; 250/227, 560

[56] References Cited
UNITED STATES PATENTS

| | | | |
|---|---|---|---|
| 3,248,029 | 4/1966 | Money............................ | 355/50 X |
| 3,469,105 | 9/1969 | Stasey............................ | 355/38 X |
| 3,718,807 | 2/1973 | Bracken et al.................. | 355/29 X |
| 3,741,645 | 6/1973 | Hollwedel, Jr. et al........... | 355/41 |
| 3,743,413 | 7/1973 | Sharp et al...................... | 355/29 |

*Primary Examiner*—Richard A. Wintercorn
*Attorney, Agent, or Firm*—Michael S. Striker

[57] ABSTRACT

Roll film transported along a predetermined path over a surface to a printing station has perforations or edge indents to mark the position of each negative. The surface over which the film is transported has a number of holes preceding the printing station in the direction of transport of the film. A light source and photoreceiver are mounted relative to the first hole in such a manner that light reflected by the film energizes the photoreceiver in the presence of the film and that no light reaches the photoreceiver upon appearance of a perforation. A distance measuring arrangement furnishes a pulse for each incremental distance that the film is transported. The signal from the photoreceiver which signifies the perforation is shifted through a shift register by the pulses from the distance measuring arrangement. The shift register has a number of stages such that after the photoreceiver signal is shifted through all of the stages, the corresponding original is positioned directly in the printing station. The motor is then stopped and the illumination for carrying out the printing process is started. When a signal is present not only in the last shift register stage but also in one or more adjoining stages, as is the case if a tear exists in the film, the signal stopping the motor is inhibited and no printing is carried out. The motor stop is also prevented in the presence of a signal from infra-red scanning means which determine the presence of a glued junction joining two film strips.

13 Claims, 5 Drawing Figures

PHOTOGRAPHIC PRINTER WITH AUTOMATIC POSITIONING CONTROL

BACKGROUND OF THE INVENTION:

The present invention relates to photographic copying arrangement for making copies or prints of originals arranged along elongated signal carrier means, that is along film in the form of film strips or rolls. In a predetermined portion of the film, that is along a predetermined line, possibly the edge of the film, are a plurality of marks each in a predetermined position relative to one of the originals. When an original is correctly positioned in a printing station, the transport means which transport the film along a predetermined path including the printing station are deactivated and the printing process is carried out automatically.

Automatic positioning of originals in such printers by use of scannable marks, for example perforations or edge indents, is widely known and utilized. In these arrangements, the scanning of the marks is generally accomplished mechanically. However, for the ever increasing transport velocities the mechanical scanners are no longer sufficiently reliable, particularly since the tolerances in the width of the film and the depth of the edge indents may vary considerably.

Until now the use of photoelectric scanning of the perforations or edge indents was made difficult if not impossible by the fact that very little room is available in the printing station and, more particularly, in the immediate vicinity of the window at which the originals are positioned during the printing process.

SUMMARY OF THE INVENTION:

It is the object of the present invention to furnish a photographic copying apparatus of the above-described type, but wherein the positioning at the printing station takes place reliably independent of the transport speed.

The present invention resides in a photographic arrangement for copying originals arranged on elongated signal carrier means, said elongated signal carrier means also having a plurality of marks arranged in a predetermined portion of said elongated signal carrier means, each of said marks being positioned in a predetermined position relative to one of said originals. The printing arrangement has transport means for transporting said elongated signal carrier means along a predetermined path past a printing station. Scanning means are arranged before said printing station in the direction of transport of said elongated signal carrier means, for scanning said predetermined portion of said elongated signal carrier means and furnishing a mark signal in response to each of said marks. Distance measuring means are coupled to said transport means for furnishing distance signals which are indicative of a predetermined incremental length of transport of said elongated signal carrier means along said predetermined path. Finally, output circuit means are furnished which are connected to said scanning means and said distance measuring means, for furnishing a stop signal stopping said transport means when said transport means has transported said elongated signal carrier means a distance corresponding to said distance between said scanning means and said printing station following receipt of one of said mark signals. It will be noted that in this arrangement the scanning means are not situated at the printing station window, thereby eliminating the space requirement in the printing station which could not be met previously. The arrangement of course operates at any desired transport speed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
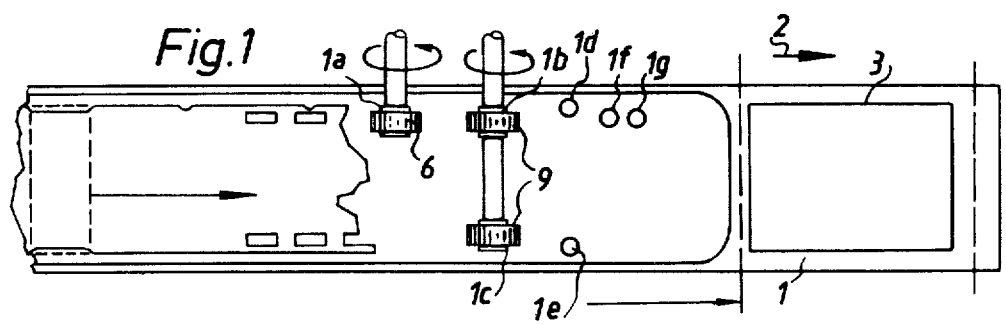
FIG. 1 shows a plan view of the arrangement of the present invention.

DESCRIPTION OF THE PREFERRED EMBODIMENTS:

A preferred embodiment of the present invention will now be described with reference to the drawing.

Figure 2:
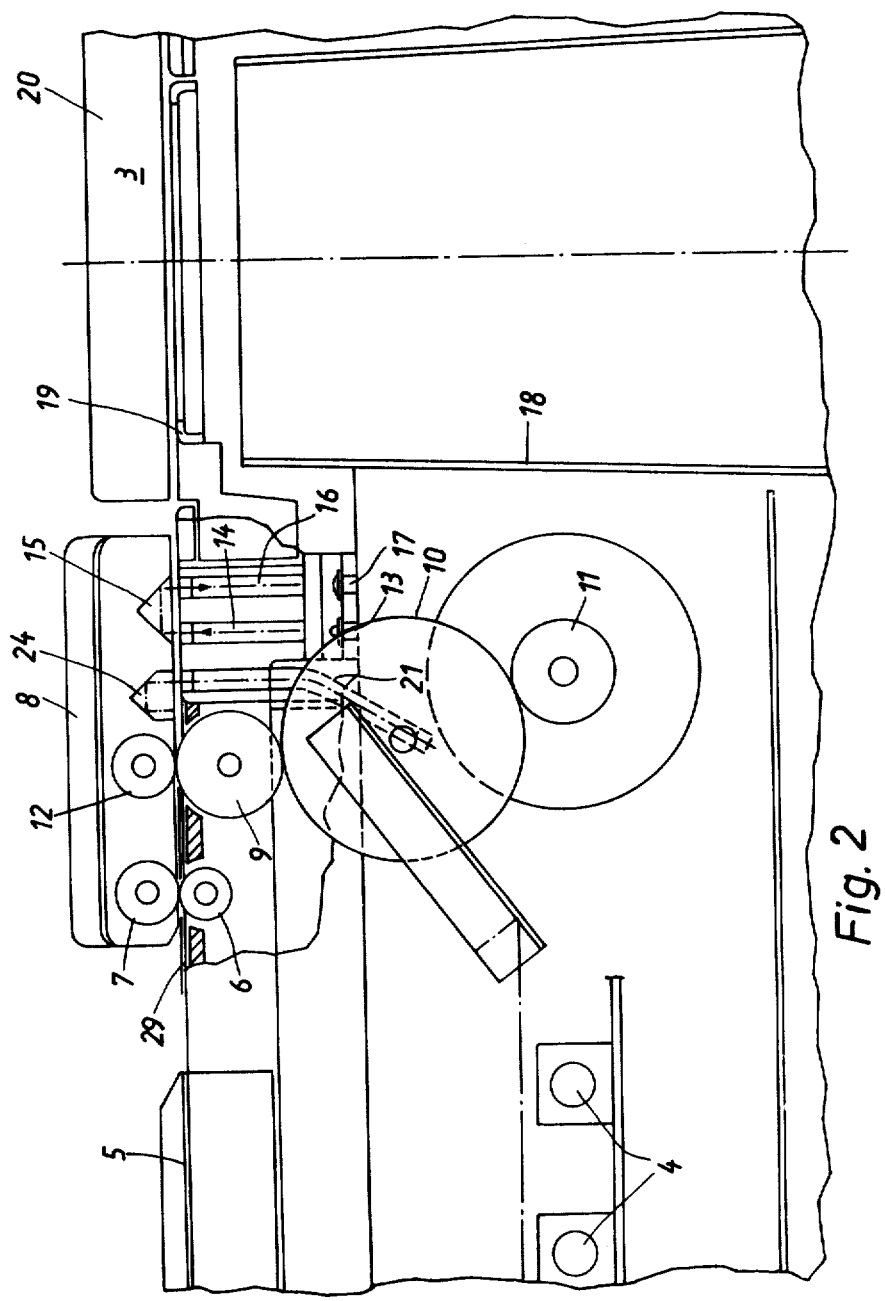
FIG. 2 is a schematic side view of the arrangement of FIG. 1.

In FIG. 1, reference numeral 1 refers to the fixed portion of a framework which forms a part of a printing arrangement of the otherwise conventional type. The lower portion of the arrangement has a smooth surface over which the film strip is transported. The surface has openings or holes $1a, 1b, 1c, 1d, 1e, 1f$ and $1g$ whose function will be explained in conjunction with the remaining Figures. The direction of transport of the film strip, herein referred to as elongated signal carrier means, is indicated by the arrow marked 2. The printing station having a window indicated by reference numeral 3 is seen to lie following the above-mentioned openings in the direction of transport of the film. Reference to FIG. 2 indicates that preceding opening $1a$ in the direction of film transport is a transparent portion of the surface 1. This portion of the surface is illuminated by lamps 4. When an operator for the equipment is available during the printing process, the originals can be examined at this point, labelled 5 in the Figure, in order that possibly required corrections relative to the automatically set exposure control may be made.

Reference to FIG. 2 further shows that a wheel 6 whose diameter and upper surface are very exactly machined protrudes through opening $1a$. This wheel operates in conjunction with a pressure roller 7 which is mounted in a movable upper portion 8 of the arrangement. (It will be noted here that the structural portions having a fixed lower portion and a movable upper portion are herein referred to interchangedly as a framework or a housing. The term "housing" thus is not limited to the outer housing of the printer). Roller 7 is mounted in such a manner that it is free to rotate and serves to press film 29 sufficiently tightly against wheel 6 so that all movement of the film takes place without slippage in the direction determined by the rotation of wheel 6. Wheel 6 is mounted on a shaft on which is also mounted a perforated disc which forms part of the distance measuring arrangement. The distance measuring means comprise and photoreceiver (not shown). When the light from the light source passes through the perforations in the disc a pulse is generated in the photoreceiver. Thus each of the pulses, herein referred to as distance signals, signify a predetermined incremental length of transport of the film. A further part of the transport means of the present invention are rollers 9 which are mounted on a common shaft and are driven by a motor 11 through an intermediate gearing 10. Cooperating with rollers 9 are pressure rollers 12 which are situated in the upper portion 8 of the housing.

A bundle of light conducting elements or fibers, which form part of the scanning means are brought up to the surface 1 through openings 1e and 1d, which are situated following the rollers 19 in the direction of transport of the film. The exact operation of the scanning means and, more specifically, of the photoelectric scanning means of which the bundle 21 of light conducting elements forms a part, will be discussed in more detail in connection with FIG. 3. Referring again to FIGS. 1 and 2, an infra-red scanning arrangement which is also part of the scanning means is arranged a short distance prior to window 3. It is the function of the infra-red scanning arrangement to detect glued junctions, namely junctions where one film strip is glued onto the next. The infra-red scanning means comprise an infra-red lamp 13, conducting elements 14, the prism 15 which is mounted in the upper movable portion 8 of the housing, a further infra-red energy conductive element 16 and a receiver 17 which is mainly sensitive in the infra-red region.

At the printing station a mirrored shaft 18 leads from a lamp housing which is not shown to a plane directly under a negative mask 19. The upper limiting surface of mask 19 is in the same horizontal plane as the surface 1. A known arrangement 20 for pressing the original against the mask is mounted above the negative mask. Since this is not a part of the present invention it will not be further described.

Figure 3:
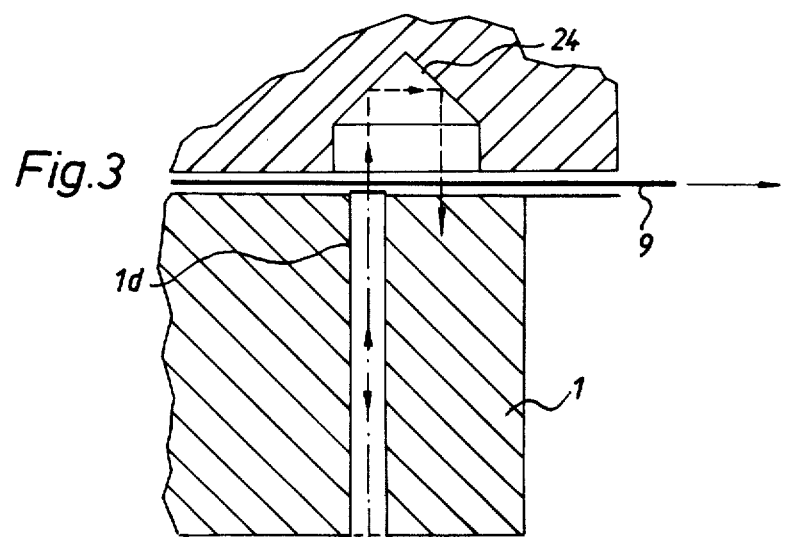
FIG. 3 is a side view of the photoelectric scanning means of the present invention.

FIG. 3 shows the details of the photoelectric scanning means. As mentioned above, light conductive fiber bundles 21 are brought to the openings 1d and 1e. The light conductive elements terminate in the plane of the film. Bundle 21 is divided into a first and second bundle, also referred to as the first and second group of light conductive elements, forming a so-called Y conductor. One portion of the Y terminates at a light source 22 while the other terminates at a photoelectric receiver 23. A light trap 29 is arranged opposite the other end of the bundle 21 in the upper portion 8 of the housing. The light trap is a conically shaped structure which has an inside surface which is matt black and whose apex is offset relative to the center of the bundle 21. The light conductive elements within bundle 21 are arranged in a raster-like fashion so that light being conducted by an element from lamp 22 will to a great extent be conducted to photoelectric receiver 23 by an adjoining fiber if the reflecting film surface is over the fiber ends.

Figure 4:
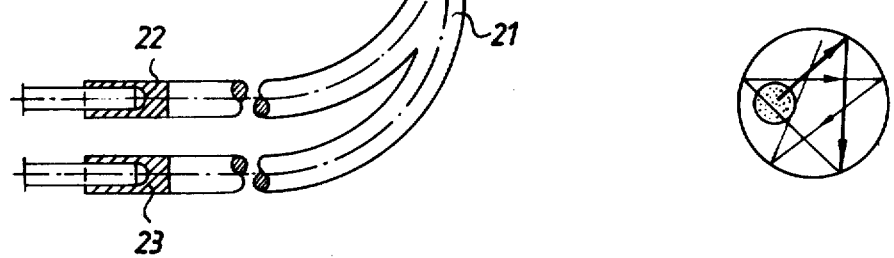
FIG. 4 is a light trap as used in the arrangement of FIG. 3.

In FIG. 4 the path of a light beam within light trap 24 is shown. Because of the highly absorptive character of the inside surface of light trap 24 the light impinging on said surface is almost completely suppressed after a few reflections.

Figure 5:
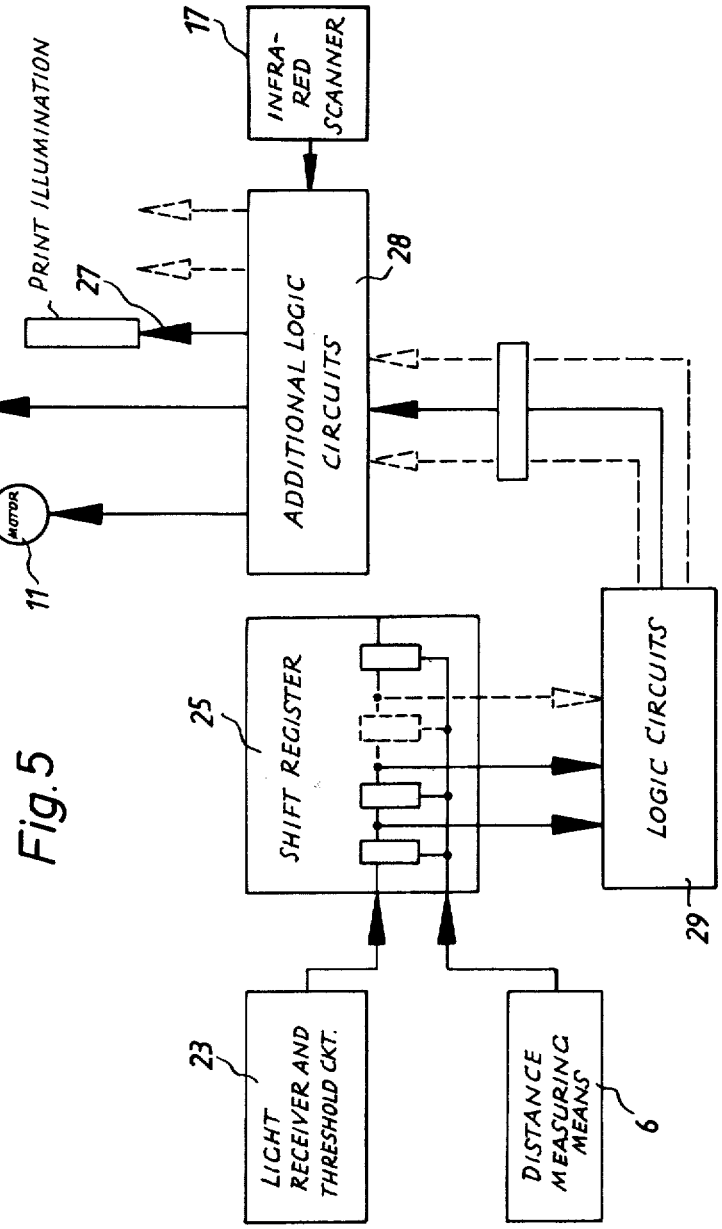
FIG. 5 is a block diagram of the output circuit means used for evaluating the signals of the scanning means shown in FIGS. 1 and 2.

FIG. 5 shows a block diagram of the output circuit means which are used to evaluate the signals derived from light receiver or photoreceiver 23, distance measuring arrangement 6 and the infra-red scanning means 17 which furnish a signal upon detecting a glued junction, that is a junction whereat two film strips have been glued together. It should be noted that in printing the film, a number of film strips, each constituting an order sent in by, for example, a photographer or a drugstore, are glued together and that it is desired to place a mark indicating the end of an order when a glued junction is detected. Also the film transport is not to be stopped in the presence of such a glued junction.

To refer back to FIG. 5, light receiver 23 comprises the actual transducers for converting light into electric current and a threshold circuit for furnishing a constant output when the electric current resulting from the light falling onto the light receiver exceeds a predetermined amplitude. The difference in current furnished by the receiver 23 in the absence and presence of the film, that is, respectively, in the presence of absence of a perforation differs sufficiently that an unambiguous output of the threshold circuit results. The signal at the output of the threshold circuit is herein referred to as a mark signal. This mark signal is present at the input of a shift register 25 one embodiment of bistable circuit means which forms part of the output circuit means. The shift input to register 25 is connected to the output of the distance measuring circuit which has been described above. Specifically each pulse at the shift input of register 25 represents a predetermined incremental length of transport of the film along its predetermined path. The shift register then has as many stages as are required in order that, when the mark signal is shifted through the last stage the corresponding original will be correctly positioned in the printing window. The shift signals, herein also referred to as distance signals may, in a preferred embodiment of the present invention, represent the transport length of 0.1 millimeters. It should be noted that if a perforation indicating the position of an original is present in the film, the signal at the output of unit 23 will be present only during one shift pulse. For tears in the film it is entirely possible that the signal at the output of unit 23 is present for a duration sufficient for the generation of two or three shift pulses. Thus in case of a tear in the film a signal will be present in two or more adjoining stages of the shift register. This is not the case for a true perforation indicating the position of a negative.

Unit 29, which is also part of the output circuit means represents logic circuits for evaluating the signals at the different stages of shift register 25. In a preferred embodiment of the present invention, these logic circuits comprise NAND-gates. These NAND-gates in a preferred embodiment of the present invention comprise a first NAND-gate which test the first two stages of shift register 25 when enabled by a signal from light receiver circuit 23 which signifies a transition from the absence of film to the presence of the film in order to determine whether a true perforation or a tear in the film has just been scanned.

In a preferred embodiment of the present invention, unit 29 contains further logic circuits to furnish signals for slowing motor 11 when the distance to be travelled by the original to the printing window is less than a predetermined distance.

The signals at the output of unit 25 are applied to a unit 28 wherein further logic circuits combine these signals with the signal from the infra-red scanner 17 in such a manner that the motor is stopped in response to a signal signifying information stored in the last bit of shift register 25 which signifies a true perforation, and that the illuminating means 27 are started immediately following the stoppage of the motor. A further output of unit 28 energizes the end of order marker in response to the signal from the infra-red scanner 17.

The above-described arrangement functions as follows:

When a new film strip 29 is to be introduced into the arrangement, the upper portion 8 is opened by releasing a catch. The upper portion 8 may for example be hinged to the lower portion 1. After the start of the film roll is inserted, the upper portion 8 and the pressure means 20 are returned to the position shown in FIG. 2. The motor is started through a pulse which is manually applied. After a length of film depending upon the length of the leader, a perforation or an edge indent will be brought into the region of the scanning means 22,23. While the film passes the scanning means, light is reflected from the surface of the film, which light is sufficient to illuminate light receiver 23 via the portion of the fiber bundle which terminates at said receiver. However, if a perforation or an indent passes over the scanning means, the light coming from bundle 21 into opening 24 is absorbed and thus only a very, very small portion of the light is reflected into the bundle which terminates at photoreceiver 23. A sufficient difference in signal between the "film present" and "perforation present" state exists that the output of the threshold circuit connected to the light receiver furnishes a reliable indication of the absence or presence of the perforation. The signal resulting from the first perforation or indent is stored in shift register 25 following receipt of the next subsequent distance signal or pulse. The signals from the distance measuring arrangement 6, namely the distance pulses, are of course applied to shift register 25 regardless of a signal from unit 23. However, in the absence of a signal from unit 23 the shift pulses are of course ineffective. However, following receipt of a signal from unit 23, and following receipt of a number of shift pulses equal to the number of stages in shift register 25, a pulse will be generated at the output of the last shift register stage which, via units 29 and 28, in the absence of inhibiting signals, will be used to stop motor 11.

If the above-described arrangement is to be used with originals having a different size, leading to a difference in the distance the film must be transported from the scanning location to the printing station, the number of stages in shift register 25 can of course be changed.

After the first print has been made, the motor is restarted. The operation than proceeds as previously described. In this manner, subsequent originals are automatically positioned in the printing station, regardless of the transport velocity.

While the invention has been illustrated and described as embodied in using particular output circuit means and scanning means, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

We claim:

1. In a photographic arrangement for copying originals arranged on elongated signal carrier means, said elongated signal carrier means also having a plurality of marks each arranged in a predetermined position relative to a corresponding one of said originals, said photographic arrangement having transport means for transporting said elongated signal carrier means along a predetermined path past a printing station, in combination, scanning means arranged a predetermined distance before said printing station in the direction of transport of said elongated signal carrier means, for scanning said predetermined portion of said elongated signal carrier means and furnishing a mark signal in response to each of said marks; distance measuring means coupled to said transport means for furnishing distance signals, each indicative of a predetermined incremental length of transport of said elongated signal carrier means along said predetermined path; and bistable circuit means connected to said scanning means and said distance measuring means and operative only upon receipt of one of said mark signals, for furnishing a stop signal for stopping said transport means following receipt of a plurality of said distance signals together signifying said predetermined distance between said scanning means and said printing station.

2. An arrangement as set forth in claim 1, wherein said marks comprise perforations in said elongated signal carrier means; and wherein said scanning means comprise a source of illumination, and photoreceiver means positioned relative to said source of illumination and said elongated signal carrier means in such a manner that said photoreceiver means receives light reflected by said elongated signal carrier means in the absence of said perforations.

3. An arrangement as set forth in claim 2, wherein said elongated signal carrier means is transported along a surface having an opening at said predetermined distance preceding said printing station in the direction of transport of said elongated signal carrier means; and wherein said scanning means further comprise a first and second group of light conductive elements respectively arranged between said source of illumination and said opening, and said photoreceiver means and said opening; wherein said first and second group of light conductive elements are formed into a raster-like bundle in the vicinity of said opening in such a manner that light passing through said first group of light conductive elements is reflected into said second group of light conductive elements in the absence of one of said perforations; further comprising a light trap arranged opposite said opening in such a manner that light from said first group of light conducting elements is absorbed by said light trap, thereby preventing light from entering said second group of light conductive elements in the presence of a perforation.

4. In a photographic arrangement for copying originals arranged on elongated signal carrier means, said elongated signal carrier means also having a plurality of perforations arranged in a predetermined portion thereof, each in a predetermined position relative to a corresponding one of said originals, in combination, transport means for transporting said elongated signal carrier means along a predetermined path including a surface having an opening, said predetermined path passing past a printing station situated along said predetermined path following said opening in the direction of transport of said elongated signal carrier means; scanning means arranged at said opening for scanning said predetermined portion of said elongated signal carrier means and furnishing a mark signal in response to each of said perforations, said scanning means comprising a source of illumination, photoreceiver means, and a first and second group of light conductive elements respectively arranged between said source of illumination and said opening and said photoreceiver means and said opening, said first and second group of light conductive elements each being formed into a raster-like bundle in the vicinity of said opening in such a manner that light passing through said first group of light conductive elements is reflected into said second group of light conductive elements in the absence of one of said perforations, said scanning means further comprising a light trap arranged opposite said opening in such a manner that light from said first group light conductive elements is absorbed by said light trap, thereby preventing light from entering said second group of light conductive elements in the presence of a perforation; distance measuring means coupled to said transport means for furnishing distance signals, each indicative of a predetermined incremental length of transport of said elongated signal carrier means along said predetermined path; and output circuit means connected to said scanning means and said distance measuring means for furnishing a stop signal for stopping said transport means when said transport means has transported said elongated signal carrier means said predetermined distance following receipt of one of said mark signals.

5. An arrangement as set forth in claim 4, wherein said light trap is a conical light trap having a matt black inner surface and having an apex offset relative to the center of said bundle of light conductive elements.

6. An arrangement as set forth in claim 4, wherein said surface is the top surface of the lower, stationary portion of a housing; wherein said transport means comprise a pair of friction rollers; wherein said distance measuring means comprise a friction roller; and wherein said pair of transport rollers, said friction roller and said light conductive elements are arranged in said lower portion.

7. An arrangement as set forth in claim 6, wherein said housing further comprises an upper portion movably mounted with respect to said lower portion; wherein said transport means further comprise a backup roller cooperating with said transport rollers; wherein said distance measuring means further comprise a backup roller cooperating with said friction roller; and wherein said backup rollers and said light trap are arranged in said upper portion of said housing.

8. An arrangement as set forth in claim 4, wherein said elongated signal carrier means comprise a plurality of elongated signal carrier sections joined at junctions with infra-red absorbing tape; and wherein said sensing means further comprise a source of infra-red energy and receiver means responsive to said infra-red energy arranged on said lower portion of said housing; wherein said surface has an opening arranged in the path of energy emitted by said source of infra-red energy; further comprising optical means arranged in said upper portion of said housing for reflecting at least a portion of said infra-red energy passing through said elongated signal carrier means in the absence of a junction towards said receiver means.

9. An arrangement as set forth in claim 8, wherein said optical means comprise a 90° prism.

10. An arrangement as set forth in claim 8, wherein said optical means comprise a 90° mirror.

11. An arrangement as set forth in claim 8, wherein said receiver means furnish a junction signal in the absence of receipt of said infra-red energy; further comprising means for connecting said receiver means to said output circuit means; and wherein said output circuit means comprise means for inhibiting the furnishing of said stop signal in the presence of said junction signal.

12. An arrangement as set forth in claim 1, wherein said bistable circuit means comprise shift register means having a shift input connected to said distance measuring means and a signal input connected to said scanning means; wherein said shift register has a plurality of stages corresponding in number to the number of distance signals signifying said predetermined distance between said scanning means and said printing station; wherein each of said shift signals shifts a mark signal present in a predetermined stage of said shift register to the next subsequent one of said stages of said shift register; and wherein a mark signal in the last of said stages of said shift register constitutes said stop signal.

13. An arrangement as set forth in claim 12, wherein each of said marks is a perforation in said elongated signal carrier means and wherein said scanning means furnish said mark signal in response to an absence of said elongated signal carrier means at said predetermined location, whereby a mark signal is furnished in response to a tear in said elongated signal carrier means; wherein said mark signal signifying a perforation has a predetermined duration; wherein said mark signals signifying a tear in said elongated signal carrier means have a duration long compared to the duration of said mark signals indicative of a perforation; wherein a signal is stored in at least the last two stages of said shift register following receipt of a mark signal signifying a tear; and wherein said output circuit means comprise a logic gate inhibiting the generation of said stop signal in the presence of a signal in said last two stages of said shift register.

* * * * *